United States Patent [19]

McPhee et al.

[11] Patent Number: 5,324,438

[45] Date of Patent: Jun. 28, 1994

[54] METHODS OF CATALYTIC PHOTOOXIDATION

[75] Inventors: Wayne McPhee, Toronto; Paul Martin, Willowdale, both of Canada

[73] Assignee: Cryptonics Corporation, Ontario, Canada

[21] Appl. No.: 983,158

[22] Filed: Nov. 30, 1992

[51] Int. Cl.⁵ .............................. C02F 1/32; C02F 1/76
[52] U.S. Cl. .................................. 210/748; 210/753; 210/908; 210/909
[58] Field of Search ............... 210/748, 753, 763, 908, 210/909

[56] References Cited

U.S. PATENT DOCUMENTS

| | | | |
|---|---|---|---|
| 3,232,869 | 1/1966 | Gard | 210/753 |
| 3,288,708 | 11/1966 | Cordle et al. | 210/753 |
| 3,649,493 | 5/1972 | Meiners | 210/62 |
| 3,839,169 | 10/1974 | Moyer | 210/748 |
| 3,970,554 | 7/1976 | Fischer et al. | 210/753 |
| 4,402,836 | 9/1983 | Fochtman | 210/748 |
| 4,437,999 | 3/1984 | Mayne | 210/748 |

Primary Examiner—Thomas Wyse
Attorney, Agent, or Firm—Lowe, Price, LeBlanc & Becker

[57] ABSTRACT

A process for oxidizing a compound comprises contacting the compound with iodide ions and irradiating the iodide ions with UV light of a wavelength sufficient to generate iodine atoms. The compound is then oxidized with the resulting iodine atoms. The iodine atoms are reduce to iodide ions as a result of the oxidation of the compound.

11 Claims, 5 Drawing Sheets

METHODS OF CATALYTIC PHOTOOXIDATION

FIELD OF THE INVENTION

This invention relates to a catalytic process for oxidising chemical compounds. In one application, it relates to a method for destroying chemical pollutants by catalytic photooxidation.

BACKGROUND OF THE INVENTION

Photochemically generated hydroxyl radicals (·OH) or photochemically activated ozone ($O_3$) are frequently used as oxidising agents due to their high oxidation potentials.

Their high oxidation potentials can, however, be a drawback in that it may be difficult to target oxidation by these agents only to a particular desired chemical compound. The products of the initial oxidation may themselves be further oxidised by these agents, thus failing to provide the desired selectivity or, in some cases, leading to the production of undesirable or hazardous by-products.

One example where oxidation by ·OH or $O_3$ is undesirable is in the oxidative degradation of hydrazines which may occur as pollutants in waste waters or contaminated groundwaters. Thus, for example, if 1,1-dimethylhydrazine (or unsymmetrical dimethylhydrazine, UDMH) is oxidised by ·OH or $O_3$, N-nitrosodimethylamine (NDMA) is produced.

NDMA is carcinogenic and has a much lower discharge requirement than UDMH. Thus if ·OH or $O_3$ is employed as oxidant to treat waste contaminated with UDMH, a long and much more expensive treatment is required to remove the NDMA formed as a byproduct. It may be difficult to achieve the low parts per trillion (ppt) discharge requirements of NDMA even with extensive treatment by ·OH or $O_3$.

An alternative oxidant, other than ·OH or $O_3$, which does not add an oxygen molecule to the contaminant, is required to treat hydrazine waste streams. Fochtman et al. (U.S. Pat. No. 4,402,836) have disclosed a method of treatment of hydrazine-containing waste waters involving the addition of chlorine gas to the waste water followed by the application of UV light. This method has several drawbacks. Chlorine is a corrosive, toxic gas, requiring special handling which adds to the cost and inconvenience of the process. Chlorine treatment can also produce toxic chlorinated byproducts if sufficient treatment time is not allowed. As well, when high levels of hydrazines must be treated, large quantities of chlorine gas are required and result in very high concentrations of residual chloride ions ($Cl^-$) building up in the water.

Meiners et al. (U.S. Pat. No. 3,649,493) have disclosed a method for oxidizing organic contaminants by addition of a hypohalous acid and UV light. This method is safer than treatment with chlorine gas but it has several drawbacks if used to treat hydrazine-containing waste waters. Photolysis of hypohalous acids is known to produce hydroxyl radicals (·OH) and hence results in production of NDMA when UDMH is treated. As well, the treatment of high concentrations of hydrazines results in a buildup of high levels of halogen ions such as chloride ion ($Cl^-$), which may lead to corrosion problems and may also violate discharge requirements.

Iodine ($I_2$) is known to oxidize hydrazine and is used as an analytical method for hydrazine determination (Skoog, D. A. and West, D. M. in "Fundamentals of Analytical Chemistry:" 1982, CBS College Publishing, p 374–378). Iodine has, however, a low solubility in water making it impractical for waste water treatment. In addition, iodide ion ($I^-$) is a byproduct of the oxidation so that non-photochemical oxidation using $I_2$ results in the build up of $I^-$.

The ultraviolet photolysis of iodide ions produces iodine atoms and hydrated electrons. This means of generation of hydrated electrons has been harnessed in a reductive degradation process for certain contaminants (Bolton and Cater, U.S. patent application Ser. No. 7/801,808). The possibility of photooxidation by the iodine atoms produced was not explored.

There remains a need for a convenient oxidative process for degradation of hydrazines without the formation of toxic byproducts or the build up of halogen ions.

There also remains a need for an oxidising process without the poor selectivity of oxidation by ·OH or $O_3$.

SUMMARY OF THE INVENTION

A process is provided for oxidising a compound comprising contacting the compound with iodide ions and irradiating the iodide ions with UV light, thereby generating iodine atoms which oxidise the compound, the iodine atoms being reduced to iodide ions.

DESCRIPTION OF THE DRAWINGS

The invention, as exemplified by preferred embodiments, is described with reference to the drawings in which.

DETAILED DESCRIPTION OF THE INVENTION

The inventors have found, in accordance with one embodiment of the invention, that generation of iodine atoms by photolysis of iodide ions provides a convenient and efficient oxidative process suitable for oxidising a variety of substances. Since oxidation of the targeted substance by iodine atoms is accompanied by reduction of the iodine atoms, a catalytic process is provided, with regeneration of the iodide ions.

Oxidation of a substance X by the process of the invention is thought to occur in accordance with the following equations:

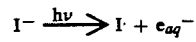

The process of the invention can be used to oxidise substances having a lower oxidation potential than the iodine atom including, for example, inorganic and organic sulfur compounds such as hydrogen sulfide, ethyl mercaptan, sulfites and thiosulfates, other mild reducing compounds such as hydroquinone and catechol, hydrazines and metals such as chromium.

Other substances oxidisable by the process of the invention will be known to those skilled in the art.

Substances oxidisable by the process of the invention are referred to herein as "compounds", which term should be understood to include chemical compounds and, as well, metals and other oxidisable substances which are not compounds.

In accordance with a further embodiment of the invention, the process of the invention can be used to treat contaminated industrial wastes or groundwaters containing pollutants oxidisable by iodine atoms.

In accordance with a preferred embodiment of the invention, wastes contaminated with hydrazines can be conveniently treated to produce satisfactory degradation of the hydrazines without accumulation of NDMA, as seen in Examples 1 and 2.

UV light of wavelength or wavelengths in the range of about 180 to about 260 nm is employed in the process of the invention. Iodide ions should be present in a concentration sufficient to absorb substantially all of the available UV light. The source of the iodide may be any suitable salt, including KI, NaI, LiI, $MgI_2$ or $CaI_2$. KI is especially preferred.

Figure 5:
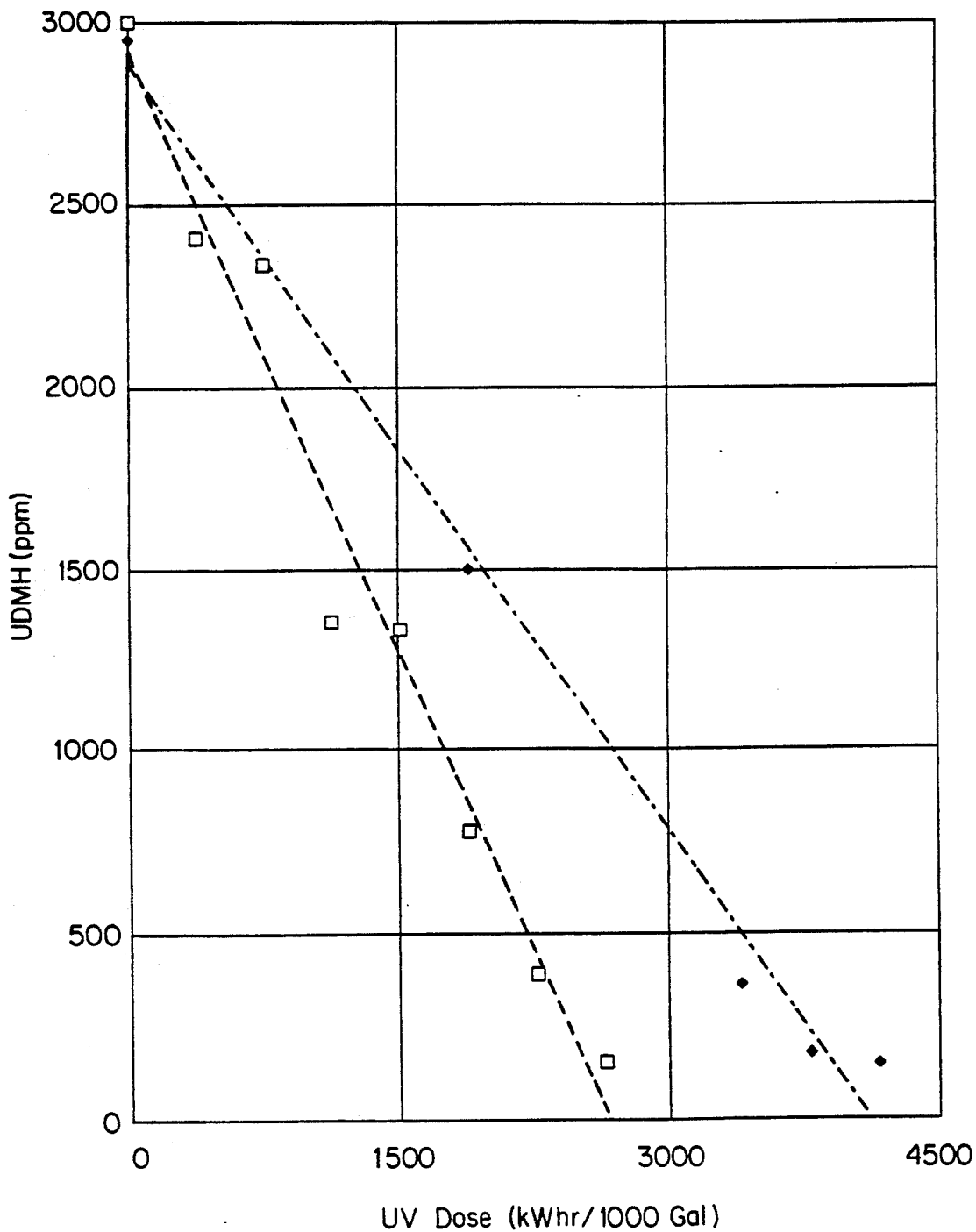
FIG. 5 compares UDMH destruction at 60° C. (♦) and 80° (□).

The quantum yield of photolysis of iodide is temperature dependent (Dainton, F. S. and Logan, S. R., Proc. Roy. Soc. (London) 287A, 1985, p 281-294). At higher temperatures, more I is produced, thus increasing the efficiency of the treatment, as seen in FIG. 5.

At low pH levels, the hydrated electrons from the photolysis of iodide react with hydrogen ions to give hydrogen atoms, which, in turn, react with the iodine atoms, reducing the efficiency of the oxidation process. Low pH values should therefore be avoided. The process of the invention may be carried out at a pH in the range of about 7 to about 13, with a range of about 7 to about 11 being preferred.

The process of the invention may be carried out at temperatures from about 0° to about 100° C. A preferred range of temperature is from ambient temperature to about 80° C.

Figure 1:
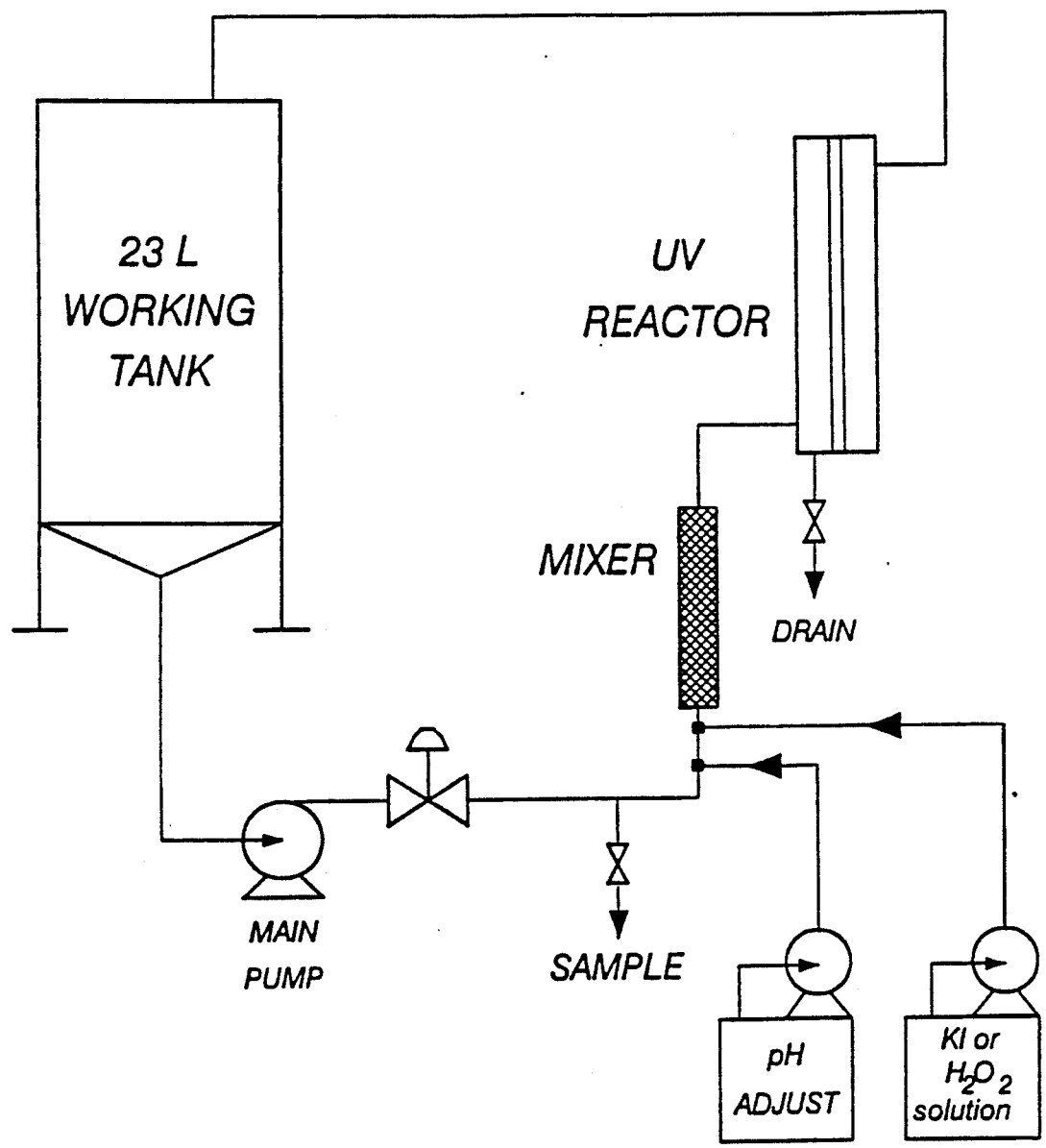
FIG. 1 is a schematic diagram of apparatus suitable for use with the process of the invention.

When the process of the invention is used to treat contaminated wastes or groundwaters, they may be treated in batch recirculation mode in a treatment apparatus such as that shown in FIG. 1, although other possible treatment systems will be known to those skilled in the art. For example, flow-through treatment can be performed by mixing the desired reagents with contaminated water and then feeding the mixture through one or more UV reactors. The number of reactors and the number of UV lamps per reactor and the power of each lamp is selected to give the desired level of treatment of the contaminants, as will be appreciated by those skilled in the art.

Contaminated wastes may contain additional contaminants that cannot be oxidized by iodine atoms. In this case, the waste may be post-treated by UV oxidation or another applicable technology, after being treated by the process of the present invention.

The following examples are merely illustrative of the process of the invention and the invention is not necessarily limited thereto.

EXAMPLE 1

Figure 2:
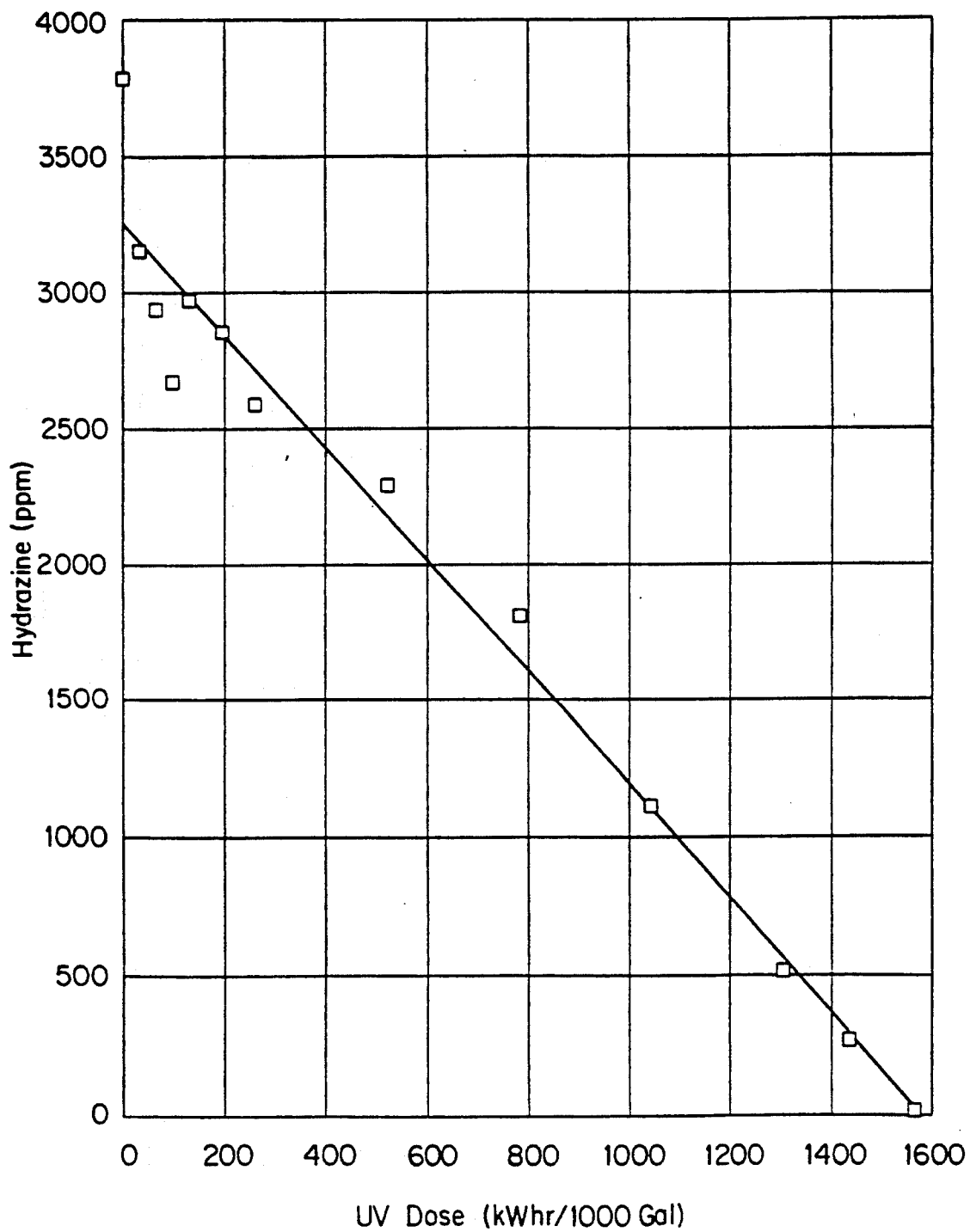
FIG. 2 shows destruction of hydrazine.

Treatment was carried out in the apparatus of FIG. 1 which includes a UV reactor having the capacity of 6 L and having a central quartz tube, diameter 4.2 cm, containing a Solarchem 1 kW high-intensity UV lamp and also includes a 23 L recycle (work) tank to give a total system capacity of 29 L. The solution to be treated was pumped through the reactor at 75 L/min from the recycle tank. The recycle tank and reactor were charged with hydrazine (75 g) in 25 L of tap water, pH was adjusted to 10 with NaOH, and KI (3.3 g) was added. The UV light was switched on and samples were taken at appropriate intervals and analyzed for hydrazine by the method of Skoog, D. A. et al. (1982), "Fundamentals of Analytical Chemistry", p. 374-378. The degradation of hydrazine is shown in FIG. 2.

EXAMPLE 2

A solution of UDMH (75 g) in .25 L tap water was treated by the method of Example 1. The degradation of UDMH was followed by a colorimetric technique. UDMH was complexed with pentacyanomine ferroate ammonium disodium salt hydrate and absorbance was measured at 505 nm.

Figure 3:
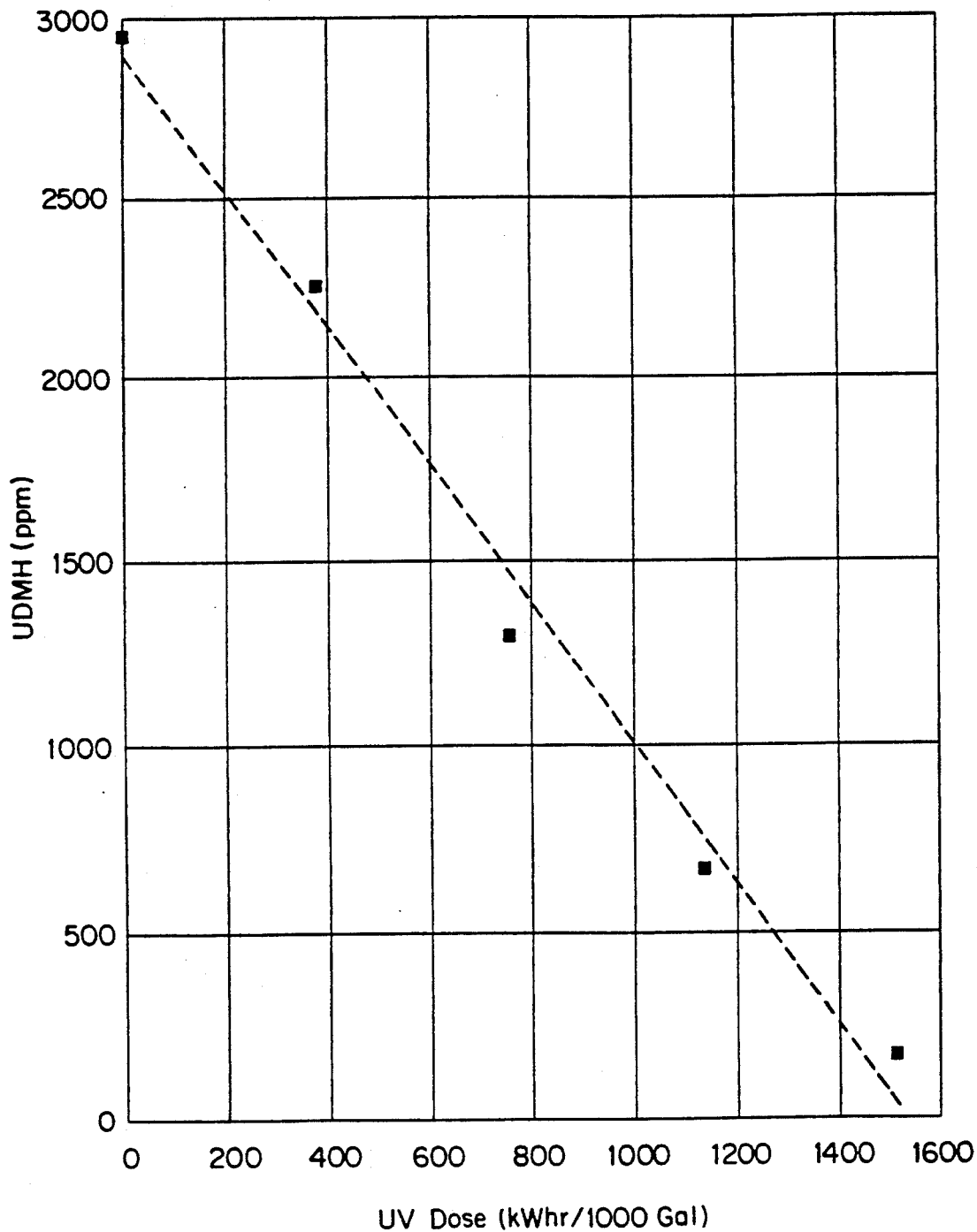
FIG. 3 shows destruction of UDMH.
Figure 4:
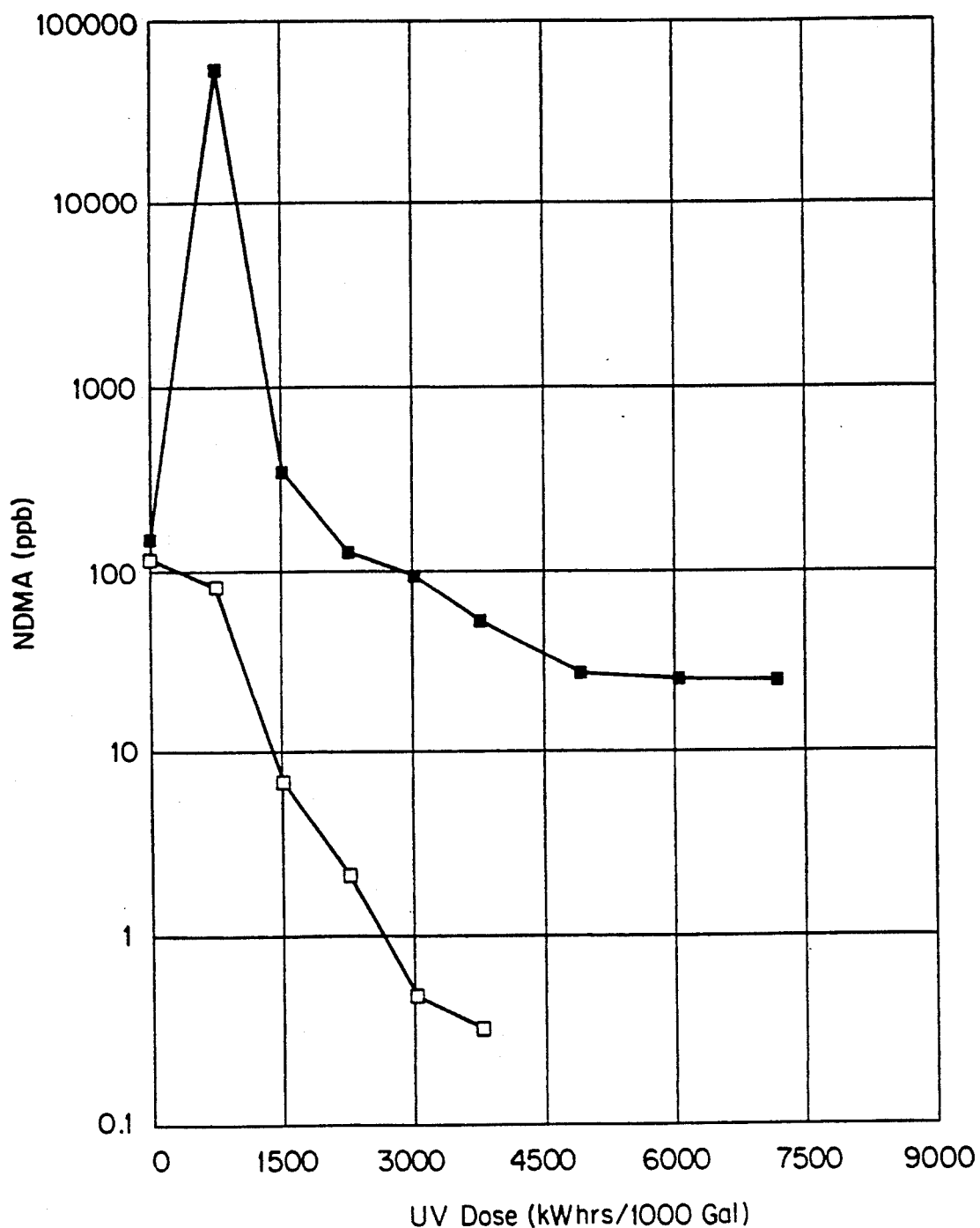
FIG. 4 shows formation and destruction of NDMA during treatment with UV/$H_2O$ (■) and UV/iodine atoms (□).

The results are shown in FIG. 3. A similar solution was treated with $UV/H_2O_2$ to compare NMDA formation. NMDA was analysed by gas chromatography/mass spectrometry. The UDMH solution contained about 100 parts per billion (ppb) of NDMA prior to treatment. FIG. 4 compares the two treatments and shows the benefit of the UV/Iodide treatment as no NDMA is formed and at the end of treatment the NDMA level is more than 2 orders of magnitude lower than that with $UV/H_2O_2$. With $UV/H_2O_2$, the NDMA level rises to 50,000 ppb during the early stages of treatment.

EXAMPLE 3

Samples of a mixture of UDMH (75 g), monomethylhydrazine (MMH) (75 g) and NDMA (35 g) in 25 L of tap water were treated at 60° C. and 80° C. in accordance with the procedure of Example 1.

MMH and UDMH were measured by the colorimetric technique described in Example 1, absorbance being measured at 450 nm for MMH and 530 nm for UDMH when both were present together. MMH alone can be measured by absorbance at 445 nm.

FIG. 5 shows degradation of UDMH and indicates that less UV energy is required to reduce the hydrazine concentration to acceptable levels at the higher temperature. Similar temperature effects were seen on the degradation of MMH and NDMA.

The present invention is not limited to the features of the embodiments described herein, but includes all variations and modifications within the scope of the claims.

We claim:

1. A process for oxidizing a compound, comprising contacting the compound with iodide ions, irradiating the iodide ions with UV light of a wavelength sufficient to generate iodine atoms, and oxidizing the compound with the resulting iodine atoms, the iodine atoms being reduced to iodide ions as a result of the oxidation of the compound.

2. A process in accordance with claim 1 wherein the compound is at least one contaminant contained in an aqueous waste or groundwater.

3. A process in accordance with claim 2 wherein the contaminant is an inorganic contaminant.

4. A process in accordance with claim 2 wherein the contaminant is an organic contaminant.

5. A process in accordance with claim 4 wherein the UV light has a wavelength in the range of about 180 nm to about 260 nm.

6. A process in accordance with claim 5, wherein the aqueous waste or groundwater has a pH in the range of about 7 to about 13.

7. A process in accordance with claim 6, wherein the source of iodide ions is a water soluble iodide salt.

8. A process in accordance with claim 7, wherein the source of iodide ions is a salt selected from the group consisting of NaI, KI, LiI, $MgI_2$ and $CaI_2$.

9. A process in accordance with claim 8, wherein the source of iodide ions is KI.

10. A process in accordance with claim 4, wherein the contaminant is one or more compounds selected from the group consisting of hydrazine, UDMH and MMH.

11. A process in accordance with claim 1 wherein the compound is selected from the group consisting of inorganic sulfur compounds, organic sulfur compounds, hydroquinone, catechol and chromium.

* * * * *